US 12,153,189 B2

United States Patent
Upasani et al.

(10) Patent No.: US 12,153,189 B2
(45) Date of Patent: Nov. 26, 2024

(54) METHOD AND SYSTEM FOR MAPPING CUT CROP MOISTURE IN A FIELD

(71) Applicant: DEERE & COMPANY, Moline, IL (US)

(72) Inventors: Sameer Subhash Upasani, Pune (IN); Kedarnath Rugge, Pune (IN); Jason C. Eubanks, Hedrick, IA (US); Daniel E. Derscheid, Ottumwa, IA (US)

( * ) Notice: Subject to any disclaimer, the term of this patent is extended or adjusted under 35 U.S.C. 154(b) by 254 days.

(21) Appl. No.: 17/659,949

(22) Filed: Apr. 20, 2022

(65) Prior Publication Data
US 2023/0341586 A1     Oct. 26, 2023

(51) Int. Cl.
*G01W 1/10*     (2006.01)

(52) U.S. Cl.
CPC ..................... *G01W 1/10* (2013.01)

(58) Field of Classification Search
CPC ........ A01B 76/00; A01B 79/005; G01W 1/10
See application file for complete search history.

(56) References Cited

U.S. PATENT DOCUMENTS

| | | | |
|---|---|---|---|
| 8,768,667 B2 | 7/2014 | Lindores | |
| 9,140,824 B1* | 9/2015 | Mewes | A01D 91/00 |
| 2012/0101634 A1* | 4/2012 | Lindores | G06F 16/29 |
| | | | 709/219 |
| 2016/0073573 A1* | 3/2016 | Ethington | G06Q 10/06 |
| | | | 705/7.36 |
| 2017/0270446 A1* | 9/2017 | Starr | G06Q 10/06313 |
| 2017/0311559 A1* | 11/2017 | Ebert | G05D 7/0629 |
| 2019/0230875 A1* | 8/2019 | Mewes | A01B 79/005 |
| 2020/0045898 A1* | 2/2020 | Arriaza | G06F 30/27 |
| 2023/0349880 A1* | 11/2023 | Freeman | G01N 33/246 |

FOREIGN PATENT DOCUMENTS

| | | | |
|---|---|---|---|
| CN | 112488008 A | 3/2021 | |
| EP | 3314997 B1 * | 2/2020 | ........... A01B 69/008 |
| JP | 2005085059 A | 3/2005 | |

OTHER PUBLICATIONS

Wilson et al., A terrain and data-based method for generating the spatial distribution of soil moisture, Jan. 2005, pp. 43-54. Retrieved from the Internet <URL: https://www.researchgate.net/publication/222915943_A_terrain_and_data-based_method_for_generating_the_spatial_distribution_of_soil_moisture>.

\* cited by examiner

*Primary Examiner* — Yoshihisa Ishizuka (57) ABSTRACT

A method of mapping a moisture level of a cut crop in a field includes identifying a cut time at which the cut crop was cut in the field. Elevation data, soil data, and weather data of the field are retrieved. A soil moisture map is then created to define a respective soil moisture level of the soil for each of a plurality of elevation zones in the field. The soil moisture map is based on a cut time, the elevation data, the soil data, and the weather data. A crop moisture map is then created to define a crop moisture level of the cut crop in each of the plurality of elevation zones in the field. The crop moisture map is based on the soil moisture map. By using the soil moisture map, the crop moisture map correlates the elevation data to the moisture levels of the cut crop.

19 Claims, 4 Drawing Sheets

METHOD AND SYSTEM FOR MAPPING CUT CROP MOISTURE IN A FIELD

TECHNICAL FIELD

The disclosure generally relates to a method and a system for generating a map of a crop moisture level of a cut crop material in a field.

BACKGROUND

Many different types of agricultural crops, e.g., hay alfalfa, etc., are cut or mowed in a field and then allowed to dry in the field over a period of time. Once the cut crop has dried to a desired moisture level, the cut crop material may be gathered and formed into a bale for transportation and storage. The crop may spoil if baled when too moist, i.e., when the moisture level of the crop is too high. Many factors affect the rate and/or time required to dry the crop material to a sufficient moisture level for baling. For example, the time required to dry the crop material may depend at least partially on the weather post cutting, e.g., air temperature, hours and intensity of sun light, humidity levels, etc. Other factors that may affect the dry-down time include, but are not limited to, the crop type, the crop density, and a moisture level of the soil on which the crop lies.

Typically, an operator uses their experience and knowledge to determine when the crop is ready to bale. The operator may rely on weather forecasts, past experience, prior knowledge of the field, etc., when making this determination. Additionally, computing algorithms may predict the optimal dry-down time and/or optimal baling time based on prior weather data, future weather forecasts, and crop type. In order to provide better and more accurate data to the operator, it is desirable to improve the operation and functionality of such computing algorithms and/or computing devices that predict the dry-down time and/or predict optimal time to initiate baling operations.

SUMMARY

A method of mapping a moisture level of a cut crop in a field is provided. The method includes identifying a cut time at which the cut crop was cut in the field. Elevation data is retrieved with a map controller. The elevation data defines a surface elevation of the field. Soil data is retrieved with the map controller. The soil data defines a drainage rate of the soil in the field. Weather data is retrieved with the map controller. The weather data defines a weather history associated with the field during a historical period of time including the cut time. The map controller may then define a soil moisture map. The soil moisture map defines a respective soil moisture level of the soil for each of a plurality of elevation zones in the field. The soil moisture map is based on the cut time, the elevation data, the soil data, and the weather data. The map controller may then define a crop moisture map. The crop moisture map defines a crop moisture level of the cut crop in each of the plurality of elevation zones in the field. The crop moisture map is based on the soil moisture map.

In one aspect of the disclosure, a crop moisture level is associated with and/or correlated to each of a plurality of soil moisture levels. As such, each of the plurality of soil moisture levels has an associated crop moisture level.

In one aspect of the disclosure, the map controller segments and/or partitions the field into the plurality of elevation zones based on the elevation data. Each respective one of the plurality of elevation zones includes an elevation variance between a high elevation and a low elevation of each respective one of the plurality of elevation zones. The elevation variance of each respective one of the plurality of elevation zones is equal to or less than a defined maximum elevation variance. By doing so, regions of the field of similar elevation are grouped together.

The map controller may further define a soil profile for each of the plurality of elevation zones based on the soil data. The soil profile includes characteristics of the soil, including but not limited to, soil type, soil drainage, etc. In one implementation, the soil profile may be considered in segmentation of the field into the different elevation zones, such that each respective one of the elevation zones of the field includes similar elevations and a similar or common soil type. By doing so, soil drying characteristics of each respective one of the elevation zones are consistent throughout that elevation zone.

In one aspect of the disclosure, the map controller retrieves a weather forecast. The weather forecast includes predicted weather data for the field for a future time period. The weather forecast may be retrieved, e.g., received downloaded, via a communication connection, such as but not limited to a network connection, an internet connection, a cellular connection, etc. In other implementations, the weather forecast may be retrieved from a memory of the map controller. For example, the map controller may continuously and/or periodically download and save future weather forecasts. The map controller may then retrieve the most recent weather forecast from the memory when needed.

In one implementation of the disclosure, the map controller may predict a dry-down time for each of the plurality of elevation zones. The dry-down time may be based, at least in part, on the crop moisture level of the cut crop in each of the plurality of elevation zones in the field, the soil moisture map, and the weather forecast. It should be appreciated that other factors, not described herein, may be considered in determining the dry-down time.

In one implementation of the disclosure, the map controller may communicate a notification signal to a receiver. The notification signal may include, but is not limited to, a message indicating a desired time to initiate baling operations in each of the plurality of elevation zones of the field. The receiver may include, but is not limited to, a crop management system, a portable hand-held device, a smart phone, a computer, etc. The notification signal may be communicated through a wired connection or a wireless connection. For example, the notification signal may be communicated through a network connection to a transmitter, which then broadcasts the notification signal wirelessly to a portable hand-held device.

In one implementation of the disclosure, the map controller may display or present the crop moisture map on a video display. The crop moisture map shows each of the plurality of elevation zones in the field, and may include indicia indicating the crop moisture level of the cut crop in each respective one of the plurality of elevation zones. As such, a visual representation of the crop moisture level may be presented to an operator. Additionally, the crop moisture map may include a message and/or indicia indicating the predicted dry-down time for the cut crop in each of the respective one of the plurality of elevation zones. The predicted dry-down time may include a date and time at which the map controller predicts the crop material will be suitable for baling.

In one aspect of the disclosure, the method may include the map controller locating the field. The map controller locates the field to define and/or determine geographic coordinates delineating a boundary of the field. The location of the field may be defined based on a known geographic coordinate system, latitude/longitude coordinates, etc. The map controller may, in one implementation, use a GPS receiver and/or satellite imagery to determine the location of the field. In other implementations, the map controller may locate the field by receiving inputs from an operator defining or otherwise identifying the location of the field. For example, the map controller may display a regional geographic map, from which the operator selects the field or defines the boundary of the field. The map controller may use this input to further define and/or determine coordinates defining the location of the field.

In one aspect of the disclosure, the map controller may determine a plant type of the cut crop in the field. The plant type may affect the dry-down time of the cut crop. As such, the map controller may consider and the plant type when defining the soil moisture map, such that the crop moisture map is based on the soil moisture map and the plant type of the cut crop.

A mapping system for generating a map representing a crop moisture level of a cut crop in a field is also provided. The mapping system includes a map controller including a processor and a memory having a crop moisture algorithm stored thereon. The processor is operable to execute the crop moisture algorithm to identify a cut time at which the cut crop was cut in the field. The map controller may then retrieve elevation data that defines a surface elevation of the field, retrieve soil data that defines a drainage rate of the soil in the field, and retrieve weather data that defines a weather history associated with the field during a historical period of time including the cut time. The map controller may then define a soil moisture map. The soil moisture map defines a respective soil moisture level of the soil for each of a plurality of elevation zones in the field. The soil moisture map is based on the cut time, the elevation data, the soil data, and the weather data. The map controller may then define a crop moisture map. The crop moisture map defines a crop moisture level of the cut crop in each of the plurality of elevation zones in the field. The crop moisture map is based on the soil moisture map, such that the crop moisture map is dependent upon and reflects the surface elevation of the field.

In one aspect of the disclosure, the mapping system may further include a communicator. The communicator may be operable to send and receive data signals between remote locations. The communicator may exchange data signals for communicating with a computing device located remote therefrom. As such, the communicator may include a transmitter for sending data, and a receiver for receiving data, such as but not limited to, the elevation data, soil data, weather data, weather forecasts, location data, etc.

In one aspect of the disclosure, a data file may be stored on the memory of the map controller. The data file associates and/or relates a crop moisture level with each of a plurality of soil moisture levels. The moisture level of the soil may affect the moisture level of the cut crop and the dry-down time the cut crop may require prior to bailing. As such, the soil moisture level is directly related to the crop moisture level.

In one aspect of the disclosure, the processor may be operable to execute the crop moisture algorithm to segment or partition the field into the plurality of elevation zones. The algorithm may segment the field based on the elevation data.

Each respective one of the elevation zones may include an elevation variance, between a high elevation and a low elevation of each respective one of the elevation zones, that is equal to or less than a defined maximum elevation variance. As such, each respective one of the elevation zones includes a similar surface elevation, whereby that zone may exhibit similar crop drying characteristics throughout.

In one aspect of the disclosure, the processor may be operable to execute the crop moisture algorithm to define a soil profile for each of the plurality of elevation zones. The algorithm may define the soil profile based on the soil data. As such, each respective one of the elevation zones may include a similar soil profile, whereby that zone may exhibit similar crop drying characteristics throughout.

In one aspect of the disclosure, the processor may be operable to execute the crop moisture algorithm to retrieve a weather forecast that includes predicted weather data for the field for a future time period. The algorithm may retrieve the weather forecast from a remote source, such as an internet or wireless based forecasting service. In other implementations, the map controller may receive continuous and/or periodic weather forecasts and save the weather forecasts on the memory. The algorithm may then retrieve the weather forecast from the memory of the map controller.

In one aspect of the disclosure, the processor may be operable to execute the crop moisture algorithm to predict a dry-down time for each of the elevation zones. The crop moisture algorithm may predict the dry-down time based at least in part on the crop moisture level of the cut crop in each of the plurality of elevation zones in the field, the soil moisture map, and the weather forecast. It should be appreciated that the crop moisture algorithm may include other factors in predicting the crop dry-down time.

In one aspect of the disclosure, the processor may be operable to execute the crop moisture algorithm to communicate a notification signal to a receiver. The notification signal may include a message indicating a desired time to initiate a baling operation in each of the plurality of elevation zones of the field. The notification signal may be communicated to a remote location, such as but not limited to, another computer, a management system, a portable hand-held device, a computing device, a smart phone, etc. The notification signal may be communicated via a wired and/or wireless system as is understood by those skilled in the art.

In one aspect of the disclosure, the processor may be operable to execute the crop moisture algorithm to locate the field. The crop moisture algorithm may locate the field to define geographic coordinates delineating a boundary of the field. The map controller may use, but is not limited to, a GPS system, a user selected/input value, photo imagery, or combinations thereof to locate the field and define the boundary thereof.

Accordingly, the method and system described herein improve the operation and function of the map controller, which is a specialized machine, to generate the soil moisture map and the crop moisture map, by incorporating the elevation data of the field, i.e., the surface elevation of the field. This in turn improves the operation and function of the crop moisture algorithm in predicting the dry-down time of the cut crop. Low lying portions of the field are more likely to hold moisture than higher elevations of the field. Soil containing a high moisture content may transfer moisture to the cut crop, cool the cut crop, and thereby slow the drying time of the cut crop. By factoring the elevation data into the crop moisture analysis, the operation and function of the crop moisture algorithm may be improved.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
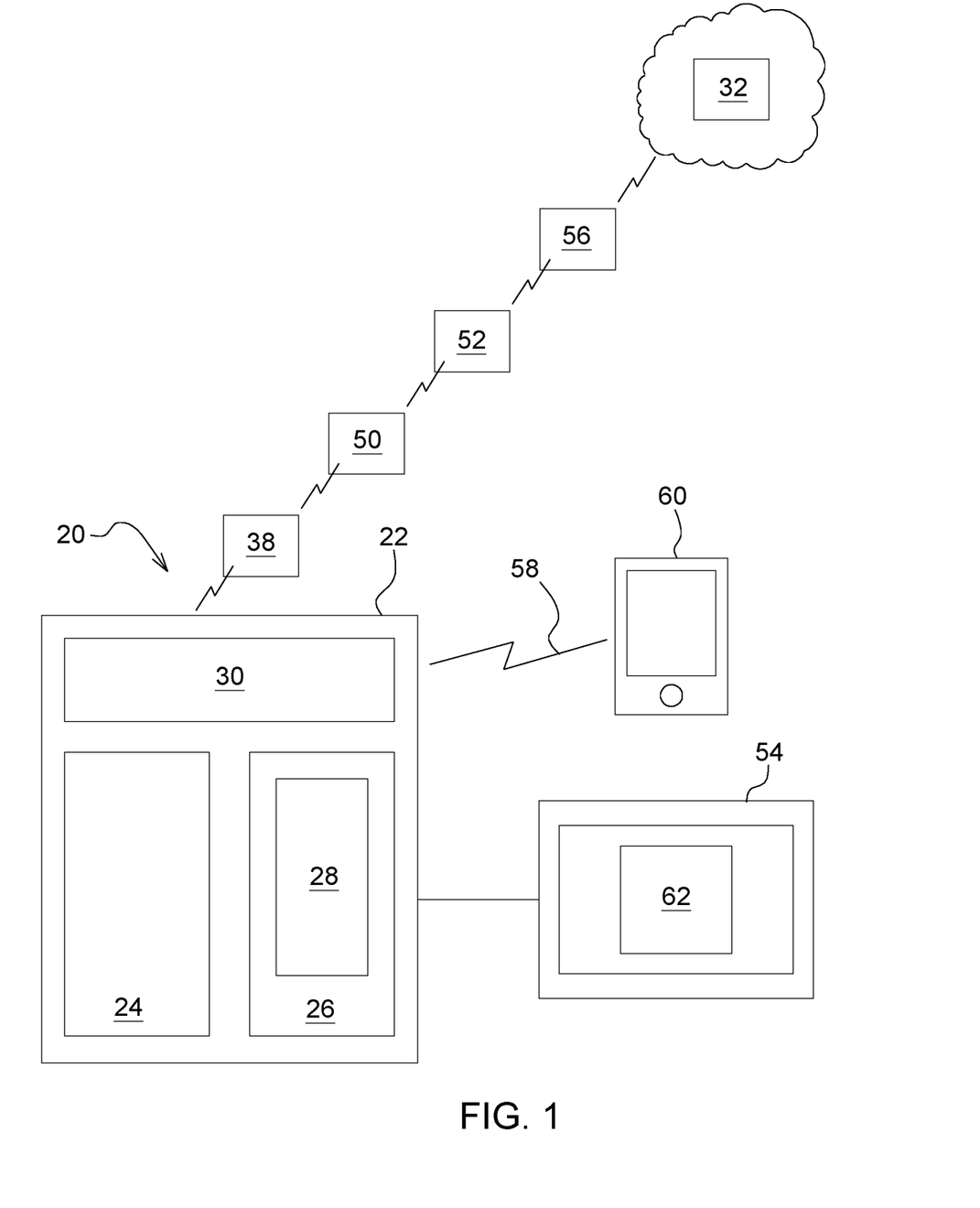
FIG. 1 is a schematic diagram of a mapping system.

Referring to the Figures, wherein like numerals indicate like parts throughout the several views, a mapping system is generally shown at 20 in FIG. 1. The mapping system 20 is configured for generating a map representing a crop moisture level of a cut crop in a field 34. The crop moisture level is the amount of moisture contained within the cut crop. In one implementation, the crop moisture level may be expressed as a percentage by weight or volume of water in the crop material. However, it should be appreciated that the crop moisture level may be expressed in some other manner not described herein.

The mapping system 20 includes a map controller 22. While the map controller 22 is generally described herein as a singular device, it should be appreciated that the map controller 22 may include multiple devices linked together to share and/or communicate information therebetween. The map controller 22 may alternatively be referred to as a computing device, a computer, a controller, a control unit, a control module, a module, etc. The map controller 22 includes a processor 24, a memory 26, and all software, hardware, algorithms, connections, sensors, etc., necessary generate the crop moisture map 62. As such, a method may be embodied as a program or algorithm operable on the map controller 22. It should be appreciated that the map controller 22 may include any device capable of analyzing data from various sensors, comparing data, making decisions, and executing the required tasks described herein.

As used herein, "map controller 22" is intended to be used consistent with how the term is used by a person of skill in the art, and refers to a computing component with processing, memory, and communication capabilities, which is utilized to execute instructions (i.e., stored on the memory 26 or received via the communication capabilities) to control or communicate with one or more other components. In certain embodiments, the map controller 22 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The map controller 22 may be in communication with other components and/or systems, such as hydraulic components, electrical components, and operator inputs within an operator station of an associated work vehicle, communication network, etc. The map controller 22 may be electrically connected to these other components wirelessly or by a wired connection such that messages, commands, and electrical power may be transmitted between the map controller 22 and the other components. Although the map controller 22 is referenced in the singular, in alternative embodiments the configuration and functionality described herein can be split across multiple devices using techniques known to a person of ordinary skill in the art.

The map controller 22 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 26 may include any non-transitory/tangible medium which participates in providing data or computer-readable instructions. The memory 26 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The map controller 22 includes the tangible, non-transitory memory 26 on which are recorded computer-executable instructions, including a moisture algorithm 28. The processor 24 of the map controller 22 is configured for executing the moisture algorithm 28. The moisture algorithm 28 implements a method of mapping the moisture level of the cut crop in the field 34, described in detail below.

The mapping system 20 may further include a communicator 30. The communicator 30 may include a device that is operable to send and/or receive data signals for communicating with another computing device 32 located remote therefrom. The communicator 30 may include any device capable of sending and/or receiving data signals, such as but not limited to, analog signals, digital signals, radio frequency signals, etc. The communicator 30 may be configured to send and/or receive the data signals through a wired connection, a wireless connection, or a combination of a wired and wireless connection. The form and manner in which data signals are transmitted and received are known to those skilled in the art, and are therefore not described in greater detail herein.

As noted above, the moisture algorithm 28 implements the method of mapping the moisture level of the cut crop in the field 34. The method may include associating and/or correlating a crop moisture level or drying factor with each of a plurality of soil moisture levels. The plurality of soil moisture levels may include a group of moisture ranges. For example, the plurality of soil moisture levels may include a range defining a soil moisture content of between 0% and 20%, a second range defining a soil moisture content of between 20% and 30%, a third range defining a soil moisture content of between 30% and 40%, etc. The plurality of soil moisture levels may include any number of defined ranges.

Changes in the moisture level of the soil may affect the moisture level in the cut crop in the field 34. Because the cut crop lies on the soil, moisture in the soil may transfer to the cut crop and/or may alter the amount of time required for the cut crop material to dry to a desired crop moisture level. The crop moisture level or drying factor relates the amount of moisture in the cut crop material to the amount of moisture in the soil, and/or relates the speed or rate at which the cut crop material may dry based on the moisture level in the field 34. It should be appreciated that a higher moisture level of the soil will generally be associated with a higher moisture level of the cut crop material and a slower dry-down time or a slower speed or rate at which the cut crop material may dry. A data file relating the crop moisture level with each of the plurality of soil moisture levels may be saved on the memory 26 of the map controller 22 and used by the map controller 22 in the process described below.

Figure 4:
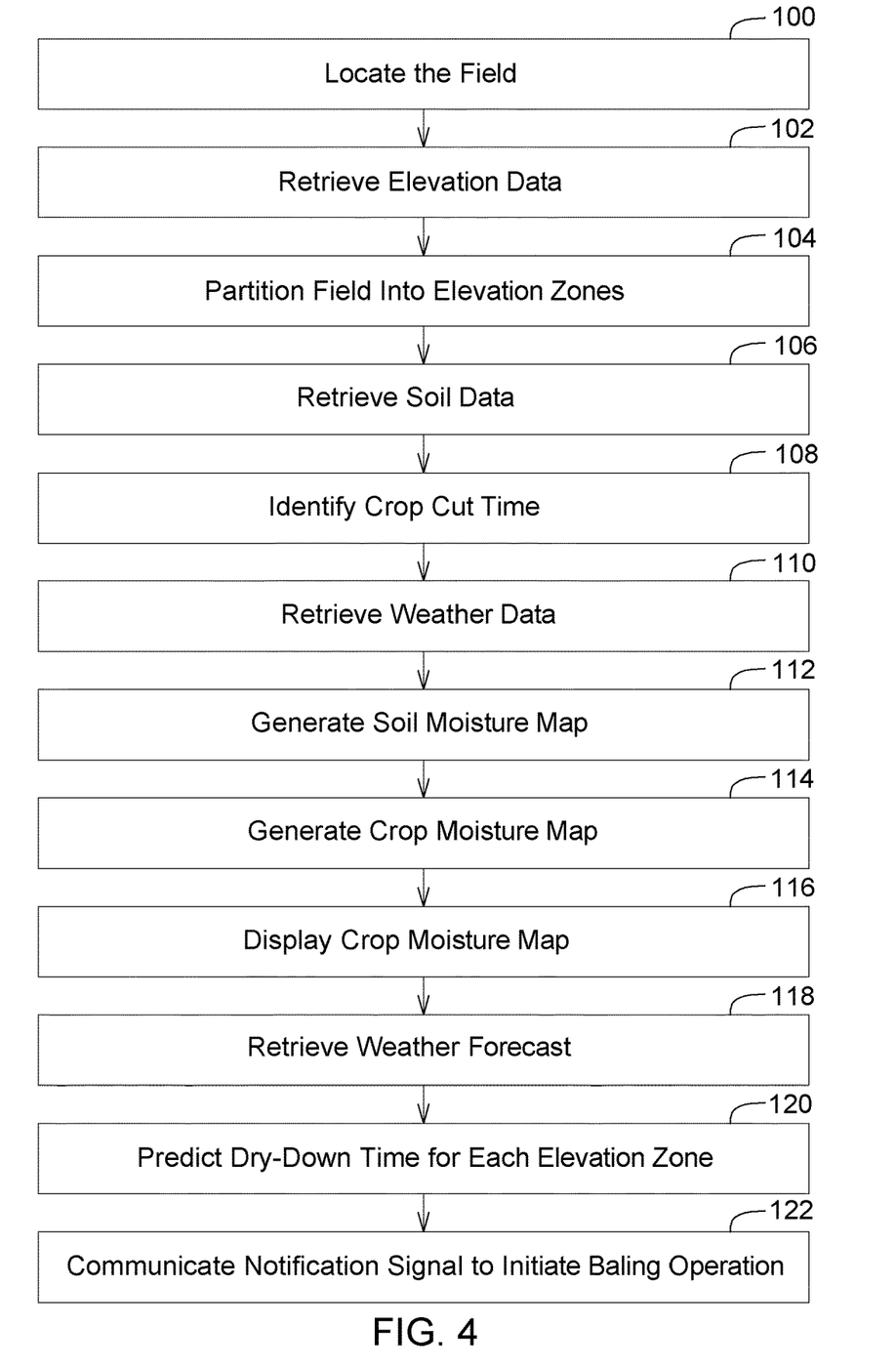
FIG. 4 is a flow chart representing a method of mapping a moisture level of a cut crop in the field.

The process described herein may further include locating the field 34. The step of locating the field is generally indicated by box 100 shown in FIG. 4. The field 34 may be located to define geographic coordinates delineating a boundary 36 of the field 34. The location of the field 34 may be defined based on a known geographic coordinate system, latitude/longitude coordinates, etc. The map controller 22 may, in one implementation, use a GPS receiver and/or satellite imagery to determine the location of the field 34, i.e., to determine one or more geographic coordinates delineating the boundary 36 of the field 34. In other implementations, the map controller 22 may locate the field 34 by receiving inputs from an operator defining or otherwise identifying the location of the field 34. For example, the map controller 22 may display a regional geographic map, from which the operator selects the field 34 or defines the boundary 36 of the field 34. The map controller 22 may use this input to further define and/or determine coordinates defining the location of the field 34.

Figure 2:
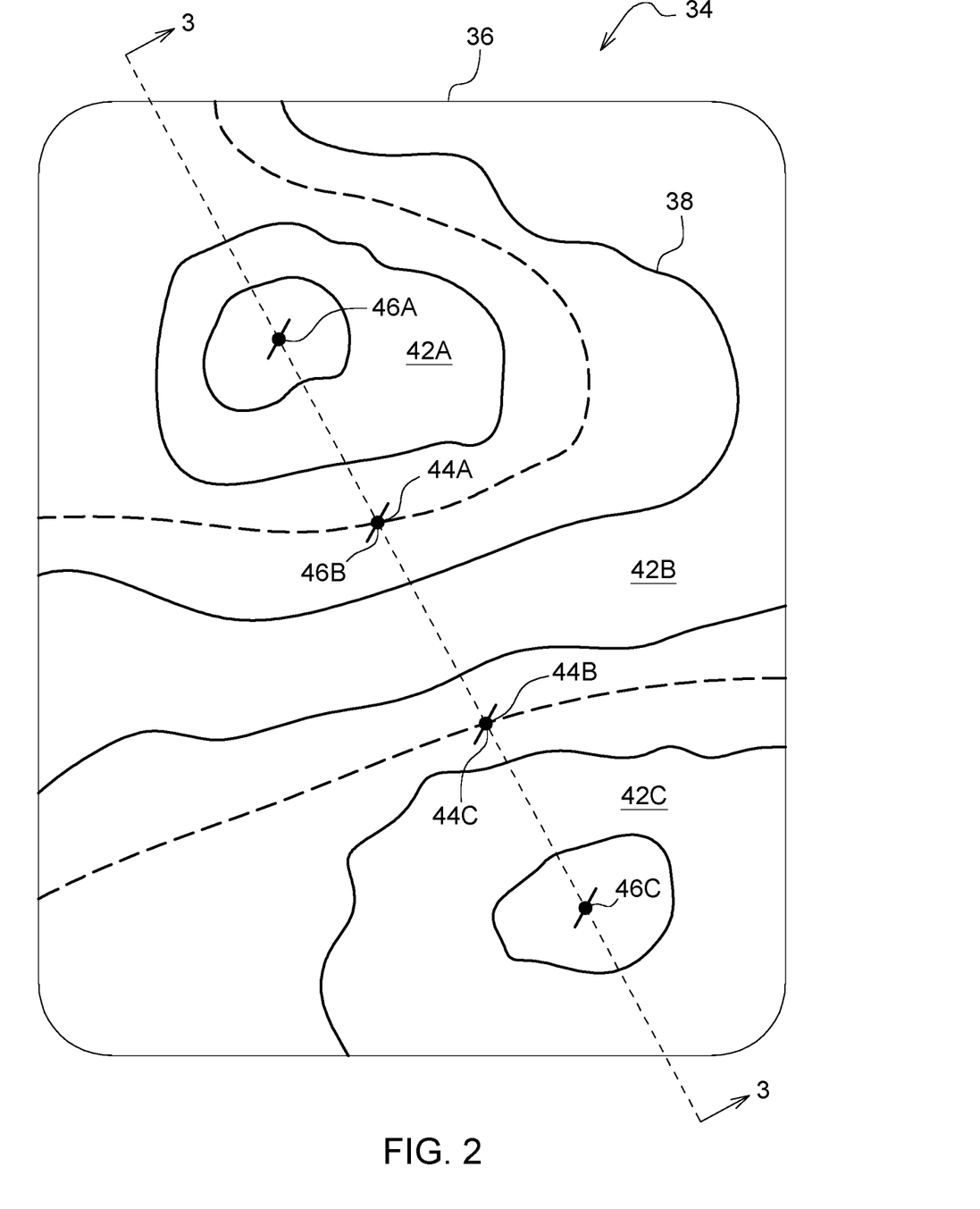
FIG. 2 is a schematic plan view of a field.
Figure 3:
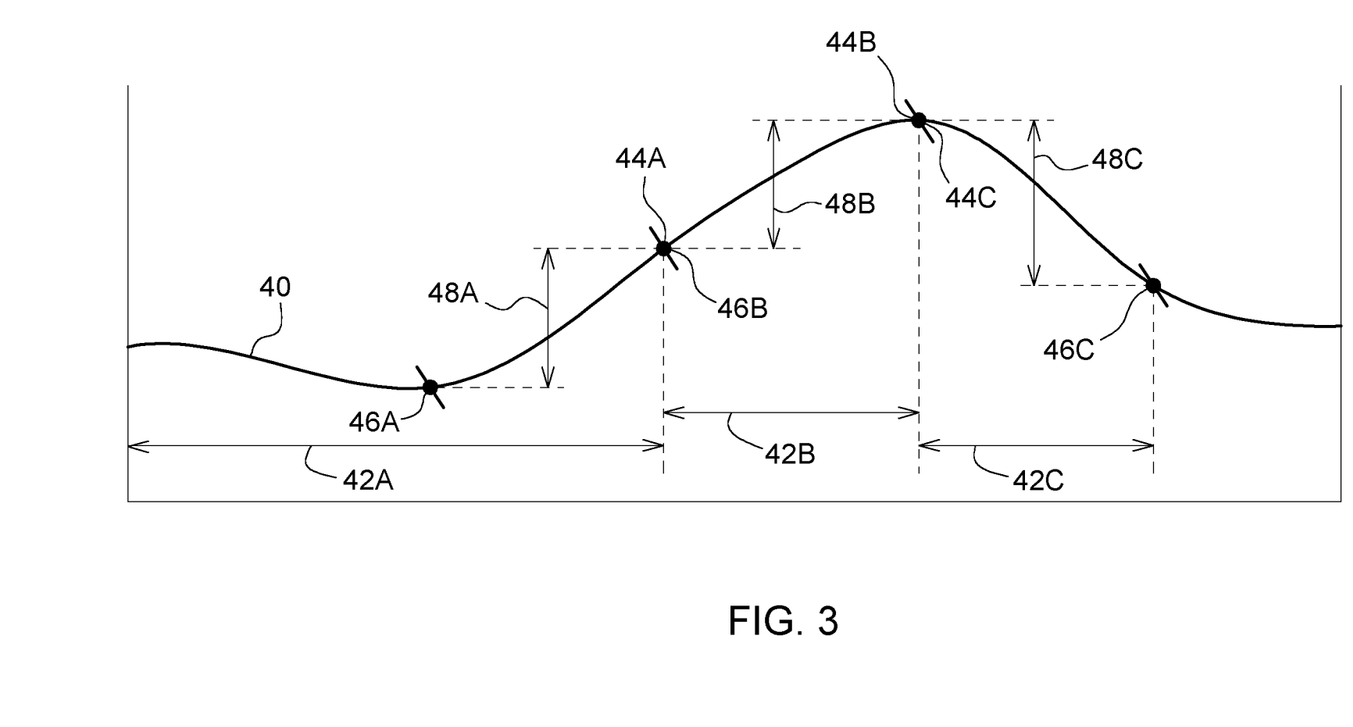
FIG. 3 is a schematic elevation view of the field along cut line 3-3 shown in FIG. 2.

The process may further include retrieving elevation data 38. The step of retrieving the elevation data is generally indicated by box 102 shown in FIG. 4. Referring to FIGS. 2 and 3, the elevation data 38 relates to and/or defines a ground surface elevation 40 of the field 34. The elevation data 38 may be saved on the memory 26 of the map controller 22, or may be saved in a data file located remote from the map controller 22 and received/downloaded via the communicator 30. The elevation data 38 may include, but is not limited to, one or more georeferenced surface point elevations, georeferenced surface contours (such as shown in FIG. 2), a point file, etc. It should be appreciated that the elevation data 38 may include any information in a form that enables the map controller 22 to determine the ground surface elevation 40 across the field 34.

The process described herein may further include segmenting and/or partitioning the field 34 into a plurality of elevation zones 42A, 42B, 42C. The step of segmenting the field into the elevation zones 42A, 42B, 42C is generally indicated by box 104 shown in FIG. 4. Each of the plurality of elevation zones 42A, 42B, 42C defines a partial region or partial area of the field 34. The elevation zones 42A, 42B, 42C may be defined based on the surface elevation 40 of the field 34, which the map controller 22 may determine or obtain from the elevation data 38. Each respective one of the plurality of elevation zones 42A, 42B, 42C may include an elevation variance 48A, 48B, 48C between a respective high elevation 44A, 44B, 44C and a respective low elevation 46A, 46B, 46C. The high elevation 44A, 44B, 44C of each respective elevation zone may be defined as the highest ground surface elevation 40 of that respective elevation zone 42A, 42B, 42C, whereas the low elevation 46A, 46B, 46C may be defined as the lowest ground surface elevation 40 of that respective elevation zone 42A, 42B, 42C. It should be appreciated that the high elevation 44A, 44B, 44C and the low elevation 46A, 46B, 46C may vary between the plurality of elevation zones 42A, 42B, 42C. The elevation variance 48A, 48B, 48C may be equal to or less than a defined maximum elevation variance. As such, the elevation variance 48A, 48B, 48C within each respective elevation zone may be less than or equal to the defined maximum elevation variance 48A, 48B, 48C, but is not greater than the defined maximum elevation variance 48A, 48B, 48C.

Referring to FIGS. 2 and 3, a first elevation zone is generally shown at 42A. The first elevation zone 42A includes a respective high elevation 44A and a respective low elevation 46A. The elevation variance 48A of the first elevation zone 42A is shown in FIG. 3. A second elevation zone is generally shown at 42B. The second elevation zone 42B includes a respective high elevation 44B and a respective low elevation 46B. The elevation variance 48B of the second elevation zone 42B is shown in FIG. 3. The high elevation 44A of the first elevation zone 42A may be defined along a common elevation with the low elevation 46B of the second elevation zone 42B. A third elevation zone is generally shown at 42C. The third elevation zone 42C includes a respective high elevation 44C and a respective low elevation 46C. The elevation variance 48C of the third elevation zone 42C is shown in FIG. 3. The high elevation 44C of the third elevation zone 42C may be defined along a common elevation with the high elevation 44B of the second elevation zone 42B.

The map controller 22 may further retrieve soil data 50. The step of retrieving the soil data 50 is generally indicated by box 106 shown in FIG. 4. The soil data 50 may relate to and/or define a characteristic that affects a drainage rate of the soil in the field 34. The soil data 50 may be saved on the memory 26 of the map controller 22, or may be saved in a data file located remote from the map controller 22 and received/downloaded via the communicator 30. The soil data 50 may include, but is not limited to, soil type descriptors, soil classifications, percolation rate, etc. It should be appreciated that the soil data 50 may include any information in a form that enables the map controller 22 to determine or identify the characteristic of the soil across the field 34.

The map controller 22 may then define a soil profile for each of the plurality of elevation zones 42A, 42B, 42C based on the soil data 50. It should be appreciated that the characteristic of the soil may change throughout different regions or areas of the field 34. As such, the soil profile for each of the different elevation zones 42A, 42B, 42C may vary. The soil profile may be based on the characteristic of the filed related to soil drainage. It should be appreciated that different soil types will drain at different rates. For example, sandy soil drains faster that soils having a high clay content. As such, the soil profile will affect the soil moisture level, which in turn may affect the dry-down time of the cut crop material.

It should be appreciated that in one implementation of the process described herein, the map controller 22 may use both the elevation data 38 and the soil data 50 to segment the filed into the plurality of different elevation zones 42A, 42B, 42C, such that each respective one of the elevation zones 42A, 42B, 42C includes an elevation variance 48A, 48B, 48C that is equal to or less than the defined maximum elevation variance 48A, 48B, 48C, and also includes a substantially consistent soil profile, such that each elevation zone exhibits a consistent soil drainage throughout.

The process may further include identifying a cut time at which the cut crop was cut in the field 34. The step of identifying the cut time is generally indicated by ox 108 shown in FIG. 4. The cut time may include a date and time of cutting. The map controller 22 may identify the cut time by, but is not limited to, retrieving data from a work machine, e.g., a mower used to cut the crop material, or by requesting/receiving a user input from an operator. In other implementations, the map controller 22 may identify the cut time by referencing other data sources, such as but not limited to satellite image data. For example, once a field 34 is located, the map controller 22 may monitor or reference photo imagery of the field 34 including time stamps to identify the cut time. It should be appreciated that the map controller 22 may identify the cut time in some other manner not described herein.

The map controller 22 may further retrieve weather data 52. The step of retrieving the weather data 52 is generally indicated by box 110 shown in FIG. 4. The weather data 52 defines a weather history associated with the field 34 during a historical period of time including the cut time. The weather data 52 may be saved on the memory 26 of the map controller 22, or may be saved in a data file located remote from the map controller 22 and received/downloaded via the communicator 30. In one implementation, the weather data 52 may include weather history from the cut time to a present or current time. In another implementation, the weather data 52 may include weather history form a period of time preceding the cut time to the present or current time. The weather data 52 may include, but is not limited to, an air temperature surrounding the field 34, a ground temperature of the field 34, periods of direct sunlight, precipitation during the historical period of time, wind direction and strength relative to the field 34, etc.

In one implementation of the process described herein, the map controller 22 may determine a plant type of the cut crop. The plant type may identify the predominant species of plant in the cut crop material. It should be appreciated that more than one plant type may be identified and/or determined in the cut crop. The plant type may be determined in any suitable manner. For example, the map controller 22 may receive a user input from an operator identifying the plant type. In another implementation, the map controller 22 may use photo imagery analyses to identify the plant type from photographic images of the cut crop. It should be appreciated that the map controller 22 may determine the plant type in a manner other than described herein.

The map controller 22 may then define and/or create a soil moisture map. The step of generating the soil moisture map is generally indicated by box 112 shown in FIG. 4. The soil moisture map defines an actual or expected soil moisture level of the soil for each of the plurality of elevation zones 42A, 42B, 42C in the field 34. The soil moisture level may be defined based on a water content per unit weight or volume, as a percentage, or in some other manner. The soil moisture level represents the amount of moisture contained in the soil in each respective elevation zone. Because water drains downward in elevation, the moisture level of the soil may vary with elevations. Regions of the field 34 with lower elevations, i.e., low lying areas, may have a higher soil moisture level than higher elevations of the field 34. Similarly, regions of the field 34 with higher elevations may dry more quickly and have a lower soil moisture level than lower elevations. As such, the ground surface elevation 40 of the field 34 may significantly affect the soil moisture level at different elevations, i.e., in different elevation zones 42A, 42B, 42C. As noted above, the different soil moisture levels may affect the rate at which the cut crop material dries, i.e., the dry-down time, which in turn affects the day/time when the cut crop may be gathered and baled. By factoring in the surface elevation 40 of the field 34, the accuracy of the soil moisture map may be improved.

The map controller 22 may define the soil moisture map based on, but not limited to, the cut time, the elevation data 38, the soil data 50, and the weather data 52. The crop moisture algorithm 28 may consider and/or factor each of the above noted criteria, as well as other criteria not described herein, to define the soil moisture map. The use of the surface elevation 40 data 38 improves the accuracy of the soil moisture map by enabling the establishment of the multiple different elevation zones 42A, 42B, 42C that may exhibit different soil moisture levels, which affect crop dry-down time differently. The map controller 22 may define the soil moisture map, using the criteria noted above, via standard criteria based mapping techniques understood by those skilled in the art.

The map controller 22 may then use the soil moisture map, which is at least partially based on the ground surface elevation 40 of the field 34, to define a crop moisture map 62. The step of generating the crop moisture map 62 is generally indicated by box 114 shown in FIG. 4. The crop moisture map 62 defines a crop moisture level of the cut crop in each of the plurality of elevation zones 42A, 42B, 42C in the field 34 and is based on the soil moisture map. The map controller 22 may use the data file, which relates the different crop moisture levels to different soil moisture levels to define the crop moisture map 62. Because the crop type may affect the rate or quantity of moisture that may transfer between the soil and the cut crop, the map controller 22 may additionally consider the plant type of the cut crop in the field 34 when defining and/or creating the crop moisture map 62.

The map controller 22 may display the crop moisture map 62 on a video display 54 in communication with the map controller 22. The step of presenting the crop moisture map 62 on the video display 54 is generally indicated by box 116 shown in FIG. 4. The video display 54 may include a dedicated monitor connected to the map controller 22. In other implementations, the video display 54 may include another display device located remotely from the map controller 22, such as but not limited to, another computing device, a portable hand held computing device, a smart phone, a laptop computer, etc. The crop moisture map 62 shows or depicts each of the plurality of elevation zones 42A, 42B, 42C in the field 34, and may include indicia indicating the crop moisture level of the cut crop in each respective one of the plurality of elevation zones 42A, 42B, 42C. The indicia may include, but is not limited to, a color coding representing moisture level of the cut crop, text describing the moisture level of the cut crop, graphics indicating the moisture level of the cut crop, etc.

In one implementation, the map controller 22 may retrieve a weather forecast 56. The step of retrieving the weather forecast 56 is generally indicated by box 118 shown in FIG. 4. The weather forecast 56 includes predicted weather data 52 for the field 34 for a future time period. The weather forecast 56 may be saved on the memory 26 of the map controller 22, or may be saved in a data file located remote from the map controller 22 and received/downloaded via the communicator 30. In one implementation, the weather forecast 56 may include weather predictions from the present or current time to a time in the future, e.g., 2-3 days into the future. The weather forecast 56 may include, but is not limited to, a predicted air temperature surrounding the field 34, a predicted ground temperature of the field 34, predicted periods of direct sunlight, predicted precipitation, predicted wind direction and strength relative to the field 34, etc.

In one implementation, the map controller 22 may further predict a dry-down time for each of the plurality of elevation zones 42A, 42B, 42C. The step of predicting the dry-down time for each the elevation zones 42A, 42B, 42C is generally indicated by box 120 shown in FIG. 4. The dry-down time may include a date and time when the moisture of the cut crop in the field 34 is expected to be equal to a desired baling moisture level that is suitable for baling the crop material into a bale. The map controller 22 may predict the dry-down time for each respective elevation zone based on, but not limited to, one or more of the crop moisture level of the cut crop in each of the plurality of elevation zones 42A, 42B, 42C in the field 34, the soil moisture map, the plant type, and/or the weather forecast 56. For example, the map controller 22 may use the crop moisture map 62 and the weather forecast 56 to predict the dry-down time for each respective elevation zone. As described above, the surface elevation 40 was factored into the creation of the crop moisture map 62. As such, the predicted dry-down time may be established based in part on the ground surface elevation 40 of each elevation zone of the field 34.

The crop moisture map 62 may be defined and/or created to include indicia indicating a predicted dry-down time for the cut crop in each of the respective one of the elevation zones 42A, 42B, 42C. For example, the crop moisture map 62 may include text indicating the predicted dry-down time, symbols or graphics indicating the predicted dry-down time, etc. Accordingly, the crop moisture map 62 may include indicia indicating the current moisture level of the cut crop based on the surface elevation 40 of each respective elevation zone in the field 34, as well as indicia indicating the predicted dry-down time for the cut crop based on the surface elevation 40 of each respective elevation zone in the field 34.

In one implementation of the process described herein, the map controller 22 may communicate a notification signal 58 to a receiver 60. The step of communicating the notification signal 58 is generally indicated by box 122 shown in FIG. 4. The notification signal 58 may include a message indicating a desired time to initiate baling operations in each of the plurality of elevation zones 42A, 42B, 42C of the field 34. The desired time may be based on the predicted dry-down time described above. The receiver 60 may include, but is not limited to, a device capable of receiving electronic communications from the map controller 22, such as but not limited to, another computer, a portable hand held device, a smart phone, a tablet, etc. The notification signal 58 may inform an operator of the predicted best time to begin baling the cut crop material in the field 34, based at least in part, on the ground surface elevation 40 of different elevations zones of the field 34. It should be appreciated that because the different elevations zones may include different soil moisture levels, that crop material may dry at different rates in each of the respective elevations zones, that the predicted best time to being baling operations may differ in each of the respective elevation zones 42A, 42B, 42C.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of mapping a moisture level of a cut crop in a field, the method comprising:
   identifying a cut time at which the cut crop was cut in the field;
   retrieving elevation data with a map controller, wherein the elevation data defines a surface elevation of the field;
   retrieving soil data with the map controller, wherein the soil data defines a drainage rate of the soil in the field;
   retrieving weather data with the map controller, wherein the weather data defines a weather history associated with the field during a historical period of time including the cut time;
   defining a soil moisture map with the map controller, wherein the soil moisture map defines a respective soil moisture level of the soil for each of a plurality of elevation zones in the field and is based on the cut time, the elevation data, the soil data, and the weather data; and
   defining a crop moisture map with the map controller, wherein the crop moisture map defines a crop moisture level contained within the cut crop in each of the plurality of elevation zones in the field and is based on the soil moisture map.

2. The method set forth in claim 1, further comprising segmenting the field into the plurality of elevation zones based on the elevation data with the map controller, wherein each respective one of the plurality of elevation zones includes an elevation variance between a high elevation and a low elevation of each respective one of the plurality of elevation zones that is equal to or less than a defined maximum elevation variance.

3. The method set forth in claim 2, further comprising defining a soil profile for each of the plurality of elevation zones based on the soil data.

4. The method set forth in claim 1, further comprising retrieving a weather forecast with the map controller, wherein the weather forecast includes predicted weather data for the field for a future time period.

5. The method set forth in claim 4, further comprising predicting a dry-down time for each of the plurality of elevation zones based on the crop moisture level of the cut crop in each of the plurality of elevation zones in the field, the soil moisture map, and the weather forecast.

6. The method set forth in claim 5, further comprising communicating a notification signal to a receiver, wherein the notification signal includes a message indicating a desired time to initiate baling operations in each of the plurality of elevation zones of the field.

7. The method set forth in claim 1, further comprising displaying the crop moisture map on a video display, wherein the crop moisture map shows each of the plurality of elevation zones in the field, and includes indicia indicating the crop moisture level of the cut crop in each respective one of the plurality of elevation zones.

8. The method set forth in claim 7, wherein the crop moisture map includes indicia indicating a predicted dry-down time for the cut crop in each of the respective one of the plurality of elevation zones.

9. The method set forth in claim 1, further comprising locating the field to define geographic coordinates delineating a boundary of the field.

10. The method set forth in claim 1, further compromising determining a plant type of the cut crop.

11. The method set forth in claim 10, the crop moisture map is based on the soil moisture map and the plant type of the cut crop.

12. A mapping system for generating a map representing a crop moisture level of a cut crop in a field, the mapping system comprising:
a map controller including a processor and a memory having a crop moisture algorithm stored thereon, wherein the processor is operable to execute the crop moisture algorithm to:
identify a cut time at which the cut crop was cut in the field;
retrieve elevation data that defines a surface elevation of the field;
retrieve soil data that defines a drainage rate of the soil in the field;
retrieve weather data that defines a weather history associated with the field during a historical period of time including the cut time;
define a soil moisture map that defines a respective soil moisture level of the soil for each of a plurality of elevation zones in the field, wherein the soil moisture map is based on the cut time, the elevation data, the soil data, and the weather data; and
define a crop moisture map that defines a crop moisture level contained within the cut crop in each of the plurality of elevation zones in the field, wherein the crop moisture map is based on the soil moisture map.

13. The mapping system set forth in claim 12, further comprising a communicator operable to send and receive data signal for communicating with a computing device located remote therefrom.

14. The mapping system set forth in claim 12, wherein the processor is operable to execute the crop moisture algorithm to segment the field into the plurality of elevation zones based on the elevation data, wherein each respective one of the plurality of elevation zones includes an elevation variance between a high elevation and a low elevation of each respective one of the plurality of elevation zones that is equal to or less than a defined maximum elevation variance.

15. The mapping system set forth in claim 14, wherein the processor is operable to execute the crop moisture algorithm to define a soil profile for each of the plurality of elevation zones based on the soil data.

16. The mapping system set forth in claim 12, wherein the processor is operable to execute the crop moisture algorithm to retrieve a weather forecast that includes predicted weather data for the field for a future time period.

17. The mapping system set forth in claim 16, wherein the processor is operable to execute the crop moisture algorithm to predict a dry-down time for each of the plurality of elevation zones based on the crop moisture level of the cut crop in each of the plurality of elevation zones in the field, the soil moisture map, and the weather forecast.

18. The mapping system set forth in claim 12, wherein the processor is operable to execute the crop moisture algorithm to communicate a notification signal to a receiver, wherein the notification signal includes a message indicating a desired time to initiate a baling operation in each of the plurality of elevation zones of the field.

19. The mapping system set forth in claim 12, wherein the processor is operable to execute the crop moisture algorithm to locate the field to define geographic coordinates delineating a boundary of the field.

* * * * *